United States Patent [19]
Tsujimoto et al.

[11] Patent Number: 5,310,593
[45] Date of Patent: May 10, 1994

[54] ADSORBENT

[75] Inventors: Soichiro Tsujimoto, Takaishi; Katsuya Kibata, Takarazuka; Yoshinobu Otake, Osaka; Masao Hirayama, Habikino; Harushi Okabe, Amagasaki, all of Japan

[73] Assignee: Osaka Gas Company Limited, Osaka, Japan

[21] Appl. No.: 783,970

[22] Filed: Oct. 29, 1991

[30] Foreign Application Priority Data

Oct. 31, 1990 [JP] Japan .................. 2-295819

[51] Int. Cl.⁵ ............................... B32B 3/00
[52] U.S. Cl. .................... 428/166; 428/120; 428/172; 428/178; 428/182; 428/184; 428/186; 428/213; 428/218; 428/225; 428/242; 428/367; 428/913
[58] Field of Search ............... 428/156, 172, 174, 178, 428/182, 184, 186, 119, 120, 166, 225, 408, 141, 213, 218, 242, 284, 402, 244, 367, 913; 156/69

[56] References Cited

U.S. PATENT DOCUMENTS

| | | | |
|---|---|---|---|
| 1,944,280 | 1/1934 | Snyder | 428/178 |
| 3,645,072 | 2/1972 | Clapham | 55/387 |
| 3,919,369 | 11/1975 | Holden | 264/45.1 |
| 3,926,702 | 12/1975 | Oki et al. | 428/178 |
| 3,943,994 | 3/1976 | Cleveland | 428/178 |
| 4,017,347 | 7/1977 | Cleveland | 428/178 |
| 4,157,929 | 6/1979 | Kubicek | 428/184 |
| 4,259,092 | 3/1981 | Matsuo et al. | 428/185 |
| 4,289,513 | 9/1981 | Brownhill et al. | 428/182 |
| 5,030,500 | 7/1991 | Perdelwitz et al. | 428/171 |

FOREIGN PATENT DOCUMENTS

| | | |
|---|---|---|
| 0231105 | 8/1987 | European Pat. Off. . |
| 0260986 | 3/1988 | European Pat. Off. . |
| 2219114 | 9/1974 | France . |
| 2228031 | 11/1974 | France . |

OTHER PUBLICATIONS

Patent Abstracts of Japan, vol. 10, No. 94, Apr. 11, 1986 & JP-A-60 225 639.
Patent Abstracts of Japan, vol. 6, No. 35, Mar. 3, 1982 & JP-A-56 155 012.
Patent Abstracts of Japan, vol. 12, No. 382, Oct. 12, 1988 & JP-A-63 130 138.
Patent Abstracts of Japan, vol. 11, No. 357, Nov. 20, 1987 & JP-A-62 129 143.

Primary Examiner—Donald J. Loney
Attorney, Agent, or Firm—Armstrong, Westerman, Hattori, McLeland & Naughton

[57] ABSTRACT

An adsorbent having high adsorption properties and a good strength, which comprises a plurality of sintered sheets of activated carbon, said sheets being those prepared by sintering activated carbon which may contain a carbonaceous binding material infusible under sintering conditions, a pulp for papers or a heat-meltable synthetic resin, and being arranged in layers so as to form a space between the adjacent sheets.

12 Claims, 3 Drawing Sheets

ADSORBENT

BACKGROUND OF THE INVENTION

The present invention relates to an adsorbent having an excellent adsorptivity, and more particularly to an adsorbent comprising built-up sheets utilizing activated carbon as an adsorbing agent.

Activated carbon has an excellent adsorption activity and has been used for various purposes, e.g. separation of gases, removal or recovery of solvents, and deodorization. Various adsorbents using activated carbon have hitherto been proposed.

For example, there is proposed an adsorbent having a honeycomb structure prepared by making a mixture of an activated carbon fiber, other fibrous materials and a heat-meltable binder into a paper, forming the paper into a honeycomb and building up the honeycombs (e.g. U.S. Pat. No. 4,259,092). However, since the adsorbent of this type contains the fibrous materials other than activated carbon in a high proportion, usually in a proportion of not less than 25% by weight and, therefore, the content of activated carbon is low, usually not more than 0.1 g/cm$^3$, and since the heat-meltable binder stops up the pores of activated carbon to decrease the pores effective for adsorption, the adsorbent has the defect that the adsorptivity is low.

There is also known an adsorbent having a honeycomb structure prepared by making a paper having a high porosity which does not contain activated carbon, impregnating the paper with activated carbon and forming it into a honeycomb. However, this adsorbent also has the defect that the adsorptivity is low, since the proportion of fibrous materials other than activated carbon is high and the content of activated carbon is low.

It is an object of the present invention to provide an adsorbent having a high adsorption activity.

A further object of the present invention is to provide a sheet-like adsorbent having a high content of activated carbon and having a mechanical strength sufficient for use.

Another object of the present invention is to provide a process for preparing a shaped article which contains activated carbon in a high proportion with a high retention rate of the adsorption activity of the activated carbon used and is useful as an adsorbent.

These and other objects of the present invention will become apparent from the description hereinafter.

SUMMARY OF THE INVENTION

It has been found that activated carbon can be formed into a sintered body having a desired shape and a sufficient mechanical strength without substantially decreasing the adsorption activity of activated carbon when a fibrous activated carbon is used as the raw material or when a carbonaceous material nonmeltable under sintering conditions is used as a binder for an activated carbon.

In accordance with the present invention, there is provided an adsorbent comprising a plurality of sintered sheets of activated carbon, said sheets being arranged in layers so as to form a space between the adjacent two sheets.

DETAILED DESCRIPTION

Figure 1:
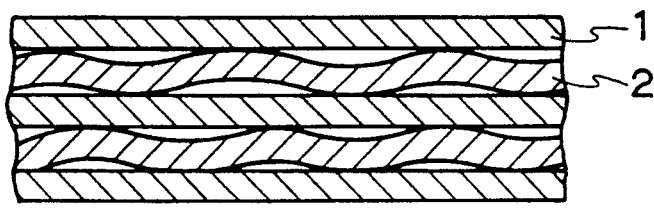
FIGS. 1 and 2 are schematic section views showing embodiments of the adsorbent according to the present invention.

The activated carbon used in the present invention may be in any form, for example, in the form of fiber, granule or powder. A fibrous activated carbon material, namely activated carbon fiber, is particularly preferred, because a sintered body having a high strength is obtained with the use of a less amount of a binder based on intertwinement of fibers and structural properties such as high strength in the fiber direction. Accordingly, it is desirable that a part or whole of the activated carbon used is an activated carbon fiber. The activated carbon fiber used in the present invention is not limited to particular one. An activated carbon fiber having a diameter of about 5 to about 30 μm, a length of about 0.05 to about 10 mm, microvoids or pores the radius of which is from about 5 to about 20 angstroms, and a specific surface area of about 500 to about 2500 m$^2$/g is usually employed. As the powdered activated carbon, a fine powder having an average particle size of about 10 to about 100 μm and having a specific surface area of 300 to 2000 m$^2$/g is preferably used from the viewpoint of adsorption and desorption characteristics.

The raw materials for activated carbon are not particularly limited, and activated carbons derived from various materials, e.g. coal, petroleum, phenol resin, polyacrylonitrile (PAN), cellulose, nut shells such as coconut husk, and wood, can be used in the present invention.

A sintered body of activated carbon is prepared by forming the activated carbon alone or a uniform mixture of the activated carbon and a binder into a desired shape such as flat sheet or corrugated sheet, and then sintering the resulting formed product, or by directly sintering the activated carbon or the mixture thereof with a binder into a desired shape. The binder is used as occasion demands, and when single use of activated carbon provides a sintered body having a sufficient strength, there is no need to use the binder. The amount of the binder is selected from not more than 20 parts by weight, preferably from 2 to 20 parts by weight, per 100 parts by weight of the activated carbon.

Carbonaceous materials infusible under sintering conditions are preferably used as the binder. Representative examples of the binder used in the present invention are, for instance, an infusibilized carbon, e.g. a stabilized, non-carbonized pitch (a pitch converted into an infusible form by a stabilization treatment according to a process for the production of pitch-based carbon fiber); a thermosetting resin such as aramid resin, phenol resin, epoxy resin or urea resin; and a thermoplastic resin converted into an infusible form by a heat treatment, e.g. an acrylic polymer or polyvinyl alcohol infusibilized according to a stabilization treatment in a process for the production of carbon fiber, but not carbonized. Unlike heat-meltable binders as used in the prior art, nonmeltable binders used in the present invention have the advantage of being hard to close the pores of activated carbon. Closing of the pores can be prevented in a higher degree, when the nonmeltable binder is used in the form of fiber, for instance, when an infusible intermediate fiber which is obtained in production of carbon fibers by a stabilization treatment of a pitch precursor fiber or a PAN precursor fiber, but not subjected to carbonization, is used as the binder. As the fibrous binders, there are preferred those having a diameter of about 5 to about 100 μm and a length of about 0.1 to about 5 mm.

A reinforcing material may be added to activated carbon or the mixture of activated carbon and binder, as occasion demands, in an amount up to about 50 parts by weight per 100 parts by weight of activated carbon. Representative examples of the reinforcing material are, for instance, a natural fiber such as hemp fiber or pulps for paper; and a heat-meltable synthetic resin fiber such as polyethylene resin, polypropylene resin or polyacrylonitrile resin.

Activated carbon alone or a uniform mixture of activated carbon and a nonmeltable binder, to which a reinforcing material may be added, is placed in a suitable mold, and is then formed with or without pressing to previously provide a pre-formed product, or is directly sintered under a pressure of 5 to 1,000 $kgf/cm^2$, preferably 10 to 200 $kgf/cm^2$, at a temperature of 500° to 1,500° C., preferably 700° to 1,200° C. When the sintering pressure is less than 5 $kgf/cm^2$ and/or the sintering temperature is less than 500° C., the sintering is insufficient, thus providing only a sintered body having a low strength and a low density. On the other hand, when the sintering temperature is more than 1,500° C., the proportion of the effective pores of activated carbon is decreased by closing of pores with a binder, thus the adsorption properties of the obtained sintered body tend to lower. When the sintering pressure is more than 1,000 $kgf/cm^2$, there is a fear that the pores of activated carbon are broken, so the adsorption properties of the obtained sintered body are lowered. The sintering time varies depending on the kind of activated carbon used, the shape of formed articles, and the kind and amount of binder, and is suitably selected in consideration thereof. Usually the sintering time is from about 5 seconds to 30 minutes.

When a fibrous activated carbon is used, a pre-formed product having a low density may be previously prepared by a dry or wet process, and then sintered under pressure and heating. As the wet process, the following process is for example adoptable as well as a process according to a paper making process. Activated carbon alone, a mixture of activated carbon and a binder, or a mixture thereof with a reinforcing material is dispersed in water with mechanically sterring to form a uniform aqueous slurry. A mold having a suction port is placed in the slurry, and the mold is sucked to give a pre-formed article. After drying the pre-formed article, it is placed in a mold and sintered under pressure and heating under the same conditions as above. In case of using activated carbon in the form of fiber, it may also be formed into a nonwoven fabric by a dry process, and then sintered in a mold under the same conditions as above. The use of pre-formed articles makes the handling easy and prevents nonuniformity in density of sintered body. In particular, when the pre-formed article prepared by wet process is used, a sintered body having a more uniform distribution of density is obtained, since the variation in density of the pre-formed article is small.

When the sintered body is prepared in the form of a sheet or board, it is desirable that the thickness is from 0.05 to 5 mm, especially from 0.2 to 1 mm. If the thickness is more than 5 mm, there is a possibility that the activated carbon present in the inside portion of the sheet is not effectively utilized for adsorption when applied to a liquid adsorption treatment.

The thus prepared sheet-like sintered body has a very high density of not less than 0.3 $g/cm^3$, usually not less than 0.4 $g/cm^3$. Also, it is composed mainly of activated carbon. Accordingly, the product of the present invention has an excellent adsorption activity, and moreover has a high strength.

Figure 2:
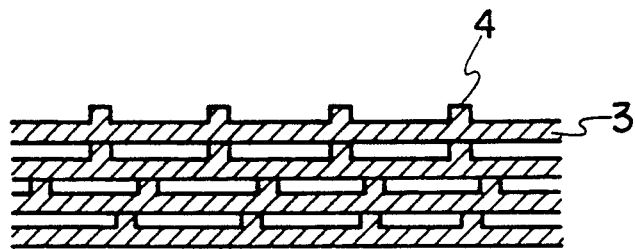
Figure 3:
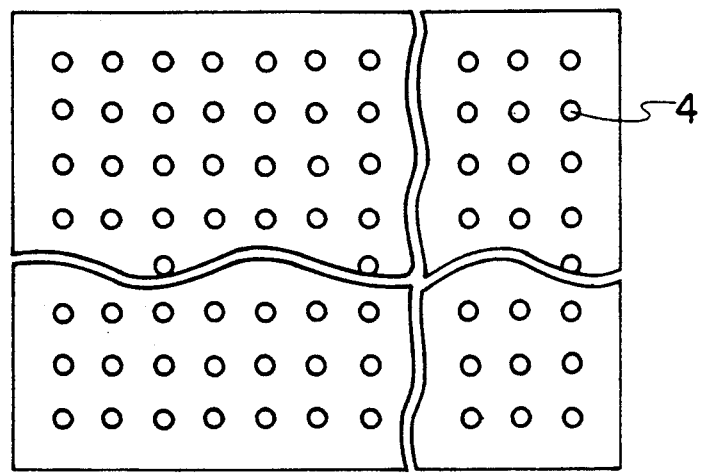
FIGS. 3 to 5 are plan views showing preferable embodiments of sintered sheets used in the adsorbent shown in FIG. 2.
Figure 4:
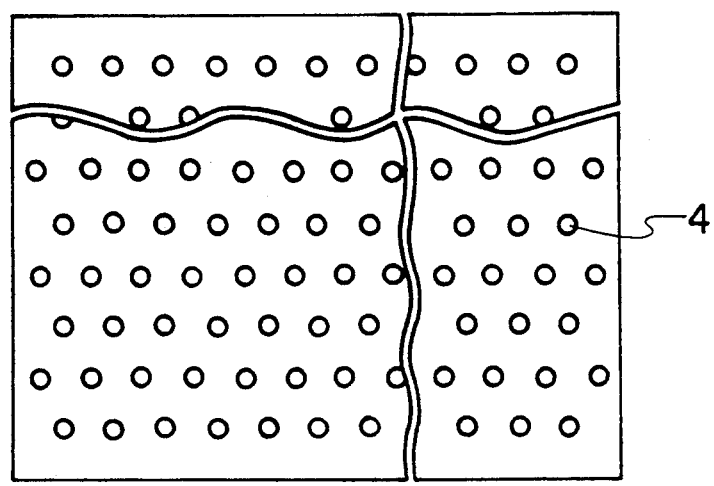
Figure 5:
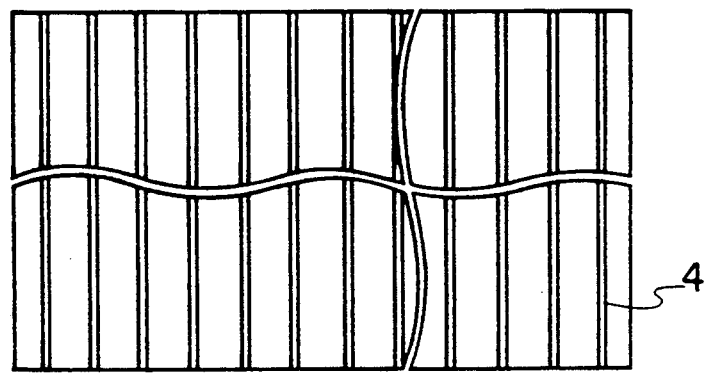

The adsorbent of the present invention comprises a plurality of the thus prepared sheet-like sintered bodies built up so as to form a space or spaces between adjacent sheets. It is important to form the spaces in allowing a fluid such as gas or liquid containing a substance to be adsorbed to flow at a low pressure loss, thus in treating the fluid in a high efficiency. The manner of forming the spaces is not particularly limited. For example, as shown in FIG. 1 which is a schematic section view of an adsorbent, the spaces can be formed by alternately building up flat sintered sheets 1 and corrugated sintered sheets 2. It is also possible to form spaces by forming a sheet-like sintered body 3 having a plurality of projections 4 in a regular or random arrangement on at least one surface as shown in FIGS. 3 to 5 and building up the sheets 3 as shown in FIG. 2, or by forming a sheet-like sintered body having a plurality of dents and projections in a regular or random arrangement and building up them so as not to engage the dents and projections to each other, or by inserting spacers between built-up flat sheets. In FIG. 3, columnar projections 4 are regularly provided on the surface of a sintered sheet. In FIG. 4, columnar projections 4 are provided in a zigzag arrangement. FIG. 5 shows another embodiment of arrangement of the projections wherein straight rib-like projections 4 are provided at regular intervals. The distance between adjacent two sheets is not particularly limited and is suitably selected according to the conditions of use of the adsorbent and the like. It is desirable under consideration of the pressure loss and the length of the adsorbent that the distance between the sheets is from 0.05 to 10 mm, especially 0.1 to 2 mm. If the distance between the sheets is less than 0.05 mm, the pressure loss is large and the adsorbent is not practical. If the distance between the sheets is more than 10 mm, substances to be adsorbed are easy to pass through the adsorbent without contacting the sintered sheet of activated carbon, and the length of the adsorbent must be increased when a higher adsorption effect is desired.

In the present invention, since activated carbon is formed into a sintered body having a high density by using an infusible binding material, closing or plugging of the pores of activated carbon scarcely occurs, unlike a conventional adsorbent prepared using a heat-meltable binder. Accordingly, the sheet-like sintered body and the adsorbent of the present invention prepared by assembling the sheets exhibit high adsorption properties. Moreover, they have a good strength. In particular, when an activated carbon in the form of fiber is used, the obtained sheet-like sintered body and the adsorbent have a higher strength because of intertwinement of activated carbon fibers and a high strength in the direction of the length of the fibers. Also, the adsorbent of the present invention wherein the sintered sheets having the advantages as mentioned above are arranged in layers with spacing between the sheets, can treat various fluids at a low pressure loss.

Accordingly, the adsorbent of the present invention having the characteristics as mentioned above is applicable to various purposes, e.g. water purification, gas purification, air purification, solvent and gasoline vapor recovery, decolorization and deodorization, and it can exhibit excellent effects. For example, if the adsorbent of the present invention is used in an adsorption type heat pump, the coefficient of performance is improved. If it is used as adsorbent of a gas separator of pressure swing adsorption (PSA) type, the separation efficiency is raised. Also, the adsorbent of the present invention is usable as the adsorbent of gas desorption type apparatuses for solvent and gasoline vapor recovery, deodorization or gas concentration and improves the rate of recovery, the rate of removal or the concentration efficiency. Further, it is usable as the adsorbent for a dehumidifier and improves the dehumidification efficiency. Also, if it is used as a gas storage tank, a large quantity of a gas can be stored by adsorption with a decreased storage pressure and easy charging and withdrawing of the gas, because activated carbon can be densely filled in the tank.

The present invention is more specifically described and explained by means of the following Examples in which all % and parts are by weight unless otherwise noted. It is to be understood that the present invention is not limited to the Examples.

EXAMPLE 1

In water were dispersed 94 parts of a pitch-based activated carbon fiber having a specific surface area of 2,000 $m^2/g$ (commercially available under the trade mark "A-20" from AD'ALL CO., LTD.) and 6 parts of an infusibilized pitch fiber (product of DONAC CO., LTD.) as a binder. The fibers were beaten to give a uniform aqueous slurry of fibers approximately all of which had a length of not more than about 5 mm.

The slurry was then charged in a flat mold having a multiplicity of holes for suction at the bottom, and sucked to give a sheet-like shaped article having a basis weight of about 450 $g/m^2$. It was then dried to give a dried sheet having a density of about 0.1 $g/cm^3$.

The dried sheet was kept at 900° C. for 10 minutes with pressing at 200 $kgf/cm^2$ by a press to give a flat sintered sheet having a size of 100 mm × 100 mm × 0.87 mm and a density of 0.52 $g/cm^3$.

Also, a dried sheet having a density of about 0.1 $g/cm^3$ prepared in the same manner as above was placed in a mold having a corrugated cavity, and was kept at 900° C. for 10 minutes under a pressure of 200 $kgf/cm^2$ to give a sintered sheet having a thickness of 0.87 mm and a density of 0.52 $g/cm^3$ in a corrugated form wherein the difference between crest and trough was 0.3 mm and the distance between adjacent crests was 10 mm.

The thus prepared flat sheets and corrugated sheets had a sufficient strength, and there was no trouble in handling them. Also, the benzene equilibrium adsorption capacity of these sheets were about 70%, thus it was found that the original adsorption activity of the pitch-based activated carbon fiber was maintained nearly unchanged.

The flat sheets and the corrugated sheets were built up alternately to provide an adsorbent as shown in FIG. 1. The bulk density of the adsorbent was 0.41 $g/cm^3$. Using the thus prepared adsorbent having a size of 10 cm × 10 cm × 10 cm (volume: 1 liter), the adsorption properties for benzene were measured under the following conditions.

Concentration of benzene: 1/10 saturated concentration at 25° C. (1.25%)
Linear velocity of gas to be treated (superficial velocity in column): 15 cm/second
Temperature of gas to be treated: 25° C.
The results of the adsorption test are as follows:
10% Break through adsorption quantity: 108 g
Pressure loss: 39 $mmH_2O$
10% Break through time: 30 minutes From these results, it would be apparent that the adsorbent of the present invention has excellent adsorption properties.

COMPARATIVE EXAMPLE 1

Using an aqueous slurry containing 65 parts of the same pitch-based activated carbon fiber as used in Example 1, 27 parts of wood pulp and 8 parts of an acrylic polymer binder, a sheet was prepared according to a paper making process. The obtained sheet had a weight basis of 142 $g/m^2$, a thickness of 0.85 mm and a bulk density of 0.17 $g/cm^3$. Also, the benzene equilibrium adsorption capacity of the sheet was as low as about 39%.

Flat sheets and corrugated sheets having the same shapes and size as in Example 1 were prepared according to the above procedures, and built up alternately to provide an adsorbent having a size of 10 cm × 10 cm × 10 cm (volume: 1 liter) and a bulk density of 0.13 $g/cm^3$.

The adsorption properties of the thus prepared adsorbent were measured in the same manner as in Example 1. The results are shown below.

10% Break through adsorption quantity: 25.4 g
Pressure loss: 41 $mmH_2O$
10% Break through time: 7 minutes The adsorption properties of the adsorbent of this Comparative Example are very inferior to those of the adsorbent according to the present invention. The pressure loss is also somewhat higher than that of the adsorbent of the invention.

In addition to the ingredients used in the Example, other ingredients can be used in the Example as set forth in the specification to obtain substantially the same results.

What we claim is:

1. An adsorbent comprising a plurality of sintered sheets of activated carbon, said sheets having a density of not less than 0.3 $g/cm^3$ and being arranged in layers so as to form spaces between adjacent sheets.

2. The adsorbent of claim 1, wherein the thickness of said sintered sheets is from 0.05 to 5 mm.

3. The adsorbent of claim 1, wherein at least one flat sheet and at least one corrugated sheet are used as said sintered sheets and they are alternately built-up to form the spaces between said adjacent sheets.

4. The adsorbent of claim 2, wherein at least one flat sheet and at least one corrugated sheet are used as said sintered sheets and they are alternately built-up to form the spaces between said adjacent sheets.

5. The adsorbent of claim 1, wherein said activated carbon is partially or totally in the form of fiber.

6. The adsorbent of claim 2, wherein said sintered sheets contain an activated carbon fiber.

7. The adsorbent of claim 3, wherein said sintered sheets contain an activated carbon fiber.

8. The adsorbent of claim 1, wherein said sintered sheets have a plurality of projections, and are built-up so as to bring the top of said projections of one sheet into contact with the back of another sheet.

9. The adsorbent of claim 2, wherein said sintered sheets have a plurality of projections, and are built-up so as to bring the top of said projections of one sheet into contact with the back of another sheet.

10. The adsorbent of claim 8, wherein said sintered sheets contain an activated carbon fiber.

11. The adsorbent of claim 9, wherein said sintered sheets contain an activated carbon fiber.

12. The adsorbent of claim 1, wherein said sintered sheets have a density of not less than 0.4 g/cm$^3$.

* * * * *